United States Patent
Hamaguchi et al.

(10) Patent No.: US 8,000,224 B2
(45) Date of Patent: Aug. 16, 2011

(54) RECEIVER AND FREQUENCY INFORMATION ESTIMATING METHOD

(75) Inventors: Yasuhiro Hamaguchi, Ichihara (JP); Hideo Namba, Chiba (JP); Shimpei To, Chiba (JP)

(73) Assignee: Sharp Kabushiki Kaisha, Osaka (JP)

( * ) Notice: Subject to any disclaimer, the term of this patent is extended or adjusted under 35 U.S.C. 154(b) by 181 days.

(21) Appl. No.: 12/302,794

(22) PCT Filed: Jun. 7, 2007

(86) PCT No.: PCT/JP2007/061581
§ 371 (c)(1),
(2), (4) Date: Nov. 26, 2008

(87) PCT Pub. No.: WO2007/142313
PCT Pub. Date: Dec. 13, 2007

(65) Prior Publication Data
US 2009/0196166 A1  Aug. 6, 2009

(30) Foreign Application Priority Data
Jun. 7, 2006  (JP) .................................. 2006-158789

(51) Int. Cl.
*H04J 11/00* (2006.01)
(52) U.S. Cl. .................. 370/208; 370/210; 375/260
(58) Field of Classification Search .................. 375/260, 375/261, 262, 268, 269, 271, 273, 272, 278, 375/316, 320, 329, 353; 370/203, 206, 208, 370/210, 204, 215
See application file for complete search history.

(56) References Cited

U.S. PATENT DOCUMENTS

| | | | | |
|---|---|---|---|---|
| 5,307,376 A | * | 4/1994 | Castelain et al. | 375/260 |
| 6,654,429 B1 | * | 11/2003 | Li | 375/316 |
| 7,242,720 B2 | * | 7/2007 | Sugiyama et al. | 375/260 |
| 2003/0227866 A1 | * | 12/2003 | Yamaguchi | 370/208 |
| 2005/0073949 A1 | | 4/2005 | Hayashi | |

FOREIGN PATENT DOCUMENTS

| | | |
|---|---|---|
| JP | 3044899 B2 | 3/2000 |
| JP | 2003-110528 A | 4/2003 |
| JP | 2003-218827 A | 7/2003 |
| JP | 2004-266814 A | 9/2004 |
| JP | 2005-130485 A | 5/2005 |
| JP | 2005-151377 A | 6/2005 |
| WO | WO-2005/081481 A1 | 9/2005 |

OTHER PUBLICATIONS

Yokomakura et al., IEICE Technical Report, Aug. 18, 2005, vol. 105, No. 240, pp. 91-96.

* cited by examiner

*Primary Examiner* — Huy D Vu
*Assistant Examiner* — Dady Chery
(74) *Attorney, Agent, or Firm* — Birch, Stewart, Kolasch & Birch, LLP

(57) ABSTRACT

A receiver 100 has a Fourier transform section 105 Fourier-transforming symbols for propagation path estimation including subcarriers modulated by known signals different for two or more antennas to calculate first frequency information, a multiplying section 107 multiplying the first frequency information by complex conjugate signals of two or more known codes to calculate second frequency information of each of the subcarriers, an interpolation information generating section 121 selecting partial information from the second frequency information on the basis of the known codes and generating interpolation frequency information interpolating the subcarriers using the selected information, a subcarrier interpolating section 122 interpolating the interpolation frequency information to the second frequency information to calculate third frequency information, and an inverse Fourier transform section 109 inverse-Fourier-transforming the third frequency information.

12 Claims, 5 Drawing Sheets

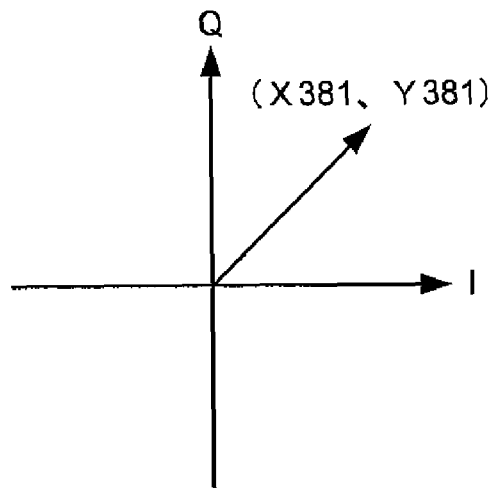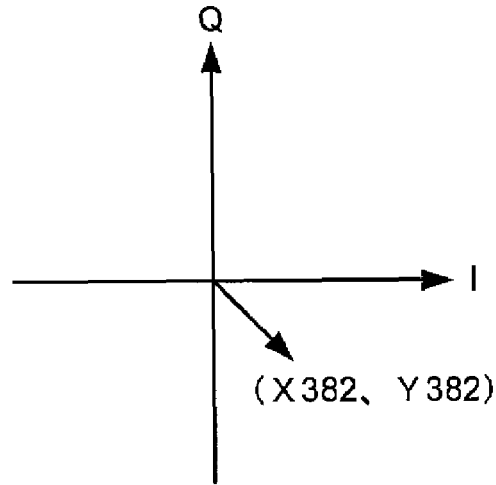
FIG. 7A  FIG. 7B
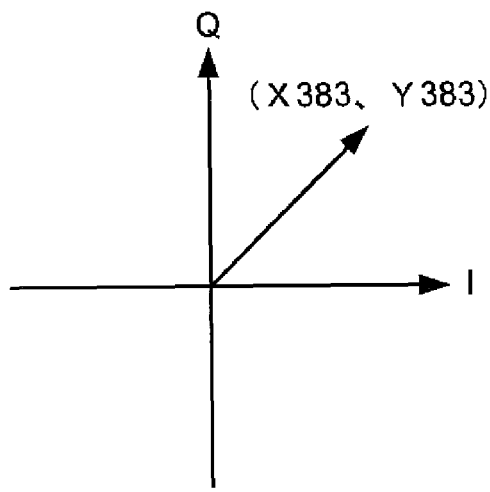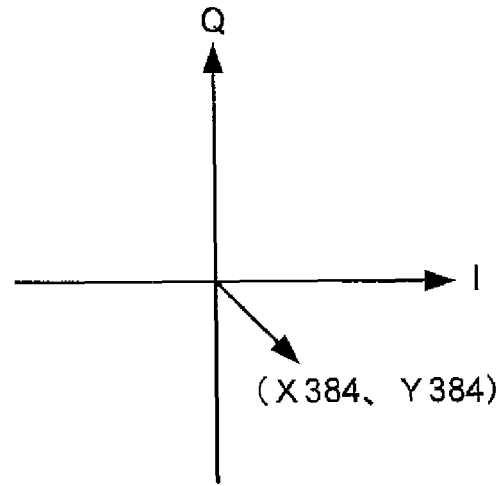
FIG. 7C  FIG. 7D

RECEIVER AND FREQUENCY INFORMATION ESTIMATING METHOD

TECHNICAL FIELD

The present invention relates to a multicarrier receiver and a multicarrier receiving method which receive a multicarrier particularly an orthogonal frequency division multiplexing (OFDM) symbol continuously arranged in a predetermined number of subcarriers and performs propagation path estimation.

BACKGROUND ART

In recent years, the number of users requiring a speedup of a radio communication system has been increasing and attention has been paid to a multicarrier transmission system represented by an OFDM system as one of systems capable of increasing the speed and capacity of it. The OFDM system arranges tens to thousands carriers at the shortest frequency interval theoretically causing no interference and transmits information signals in parallel by frequency division multiplexing. The OFDM system has an advantage of being hard to be influenced by multipath interference when the number of subcarriers to be used is increased, because of a symbol time longer than that of a single carrier system of the same transmission rate.

However, under a multipath environment, subcarriers undergo different amplitude changes and different phase changes, so that it is necessary to compensate theses changes when data is demodulated at the receiving side. As a method of compensating a propagation path, there is a method which modulates all or part of subcarriers by a code known between a transmitter and a receiver to transmit them as a pilot signal at the transmitting side, and estimates a propagation path change undergone by each of the subcarriers from a received pilot signal and compensates the estimated propagation path change at the receiving side. In this specification, a multicarrier signal including this pilot signal is referred to as "a symbol for propagation path estimation" hereinafter. Furthermore, the multicarrier signal is particularly referred to as "an OFDM symbol for propagation path estimation" when the signal formation is OFDM.

In estimation and compensation of a propagation path change, a time de-spread propagation path estimating method can be adopted which uses a Fourier transform and an inverse Fourier transform and takes advantage of the fact that a delayed profile signal is concentrated in some range of the output of the inverse Fourier transform to remove noise and interference (Patent Document 1). A gain obtained by the time de-spread propagation path estimating method is referred to as a time de-spread gain. In the OFDM system, the number of Fourier transform points (or the number of inverse Fourier transform points) used by a transmitter and a receiver seldom matches the number of subcarriers to which a signal to be transmitted is allocated (which is used for signal transmission) to correspond to making a guard band or filtering processing or the like in the transmitter. The number of Fourier transform points is usually $2^n$.

In particular, when the number of Fourier transform points is different from the number of subcarriers, a time de-spread gain is obtained, if a propagation path is estimated by a time de-spread propagation path estimating method, but a bad influence by a distortion has been remarkably seen on an end side of a band for which a frequency response is estimated according to a signal-to-noise power ratio. The distortion has a larger influence on an end side of a band for which a propagation path is estimated. For this reason, a technology which is an improved time de-spread propagation path estimating method has also been disclosed.

For example, in patent document 1, a method is disclosed which uses frequency information (frequency information from which noise, etc have been removed) for which a propagation path has been estimated by a time de-spread propagation path estimating method in the midsection of a band and uses frequency information from which noise, etc have not been removed for propagation path compensation with respect to a propagation path of a subcarrier located on an end side of the band. Furthermore, in patent document 2, a technology of easily distinguishing a reference element related to noise occurring on a transmission channel is disclosed. In other words, as a technology of distinguishing a reference element related to noise, setting a threshold when receiving, transmitting by increasing the power of the reference element, or a combination of them is disclosed. In other words, noise or interference can be removed by taking advantage of the fact that a delayed profile signal is concentrated in some range of an inverse Fourier transform output, and a distortion is prevented from occurring by also removing a signal power component when removing noise power from a delayed profile. According to this method, a precision frequency response can be calculated without being affected by a distortion or due to a time de-spread gain in the midsection of a band.

Furthermore, in these days, a multi-input/multi-output (MIMO) technology has been investigated actively. This technology transmits different data streams from different two or more antennas and distinguishes them to demodulate data by a receiver, and significantly contributes to an increase in transmission rate. A MIMO-OFDM system which is an OFDM system using a MIMO technology has also been investigated. In the MIMO-OFDM system, it is an important problem to estimate a propagation path between a transmitter and a receiver efficiently and accurately.

In non-patent document 1, a propagation path estimating method using carrier interferometry (CI) (referred to as "a CI method" hereinafter) is shown. One of features of this technology is that propagation paths from two or more transmitting antennas can be estimated with one OFDM symbol for propagation path estimation. The CI method is able to distinguish signals transmitted from the antennas by changing the amount of phase rotation of one signal for propagation path estimation and using different signals for propagation path estimation by the antennas. Thus, for example, when antenna 1 and antenna 2 are used and a propagation path from antenna 1 is calculated, a frequency response from antenna 1 can be calculated by removing a pulse corresponding to signal power from antenna 2 and performing frequency conversion. Likewise, when a propagation path from antenna 2 is calculated, a frequency response from antenna 2 can be calculated by removing a pulse corresponding to signal power from antenna 1 and performing frequency conversion.

Patent Document 1: Japanese Patent Laid-Open No. 2005-130485

Patent Document 2: Japanese Patent No. 3044899

Non-Patent Document 1: Kazunari Yokomakura et al., "Investigation about a propagation path estimation system using carrier interferometry in a MIMO-OFDM system", The Institute of Electronics, Information and Communication Engineers, Technical Report RCS2005-79, August, 2005, p. 91-96.

DISCLOSURE OF THE INVENTION

Problems to be solved by the Invention

However, also in the case that an OFDM symbol for propagation path estimation multiplexed by a CI method is used in a MIMO-OFDM system, there is a problem that a distortion occurs by that the number of Fourier transform points does not match the number of subcarriers when a propagation path is estimated with a time de-spread propagation path estimating method as in the case of one transmitting antenna. Furthermore, in a MIMO-OFDM system, a frequency response has a waveform obtained by receiving symbols for propagation path estimation transmitted from two or more antennas, so that the result of the frequency response used for propagation path compensation can not be used in different manners according to the positions of subcarriers like a method disclosed in Patent Document 1.

The present invention has been developed in view of the above circumstances and aims to provide a receiver and a frequency information estimating method which reduce a distortion of the result of calculation of a frequency response caused by removing noise, etc. when estimating a propagation path by a time de-spread propagation path estimating method in a system transmitting and receiving a multicarrier symbol using two or more antennas.

Means for Solving the Problems (1) A receiver according to the present invention receives symbols for propagation path estimation which include subcarriers modulated by different known signals and have been transmitted from two or more transmitting antennas and estimates propagation paths from the transmitting antennas, the receiver comprising: a Fourier transform section Fourier-transforming the received symbols for propagation path estimation to calculate first frequency information for each of the subcarriers; a signal generating section generating known signals which have been used for modulation of subcarriers included in the symbols for propagation path estimation; a dividing section dividing the first frequency information by one of the known signals to calculate second frequency information; an extrapolating section calculating and interpolating, from the first frequency information or the second frequency information, information of frequency responses from the transmitting antennas in positions where no subcarrier has been transmitted to calculate third frequency information; and an inverse Fourier transform section inverse-Fourier-transforming the third frequency information.

Like this, the receiver of the present invention calculates and interpolates, when receiving symbols for propagation path estimation transmitted from two or more transmitting antennas and estimating propagation paths, information of frequency responses from the transmitting antennas in positions where no subcarrier has been transmitted on the basis of the characteristics of the known signals. The symbols for propagation path estimation are received as symbols included in multicarrier symbols by the receiver. Furthermore, the symbols for propagation path estimation include subcarriers modulated by known signals different for the transmitting antennas at the transmitter side. Known signals which have been used for modulation at the transmitter side have been previously known in the receiver. Thus, the receiver is able to select subcarriers suitable for interpolation from subcarriers in a signal band and calculate interpolation frequency information using the first or second frequency information of the selected subcarriers. For this reason, propagations paths can be estimated by a time de-spread propagation path estimating method using frequency responses in frequencies wider than a frequency band actually transmitted, and thereby a distortion occurring at an end of the band can be reduced.

(2) In the receiver according to the present invention, the extrapolating section has an interpolation information generating section selecting subcarriers on the basis of a combination of known signals which have modulated subcarriers in the same position of symbols for propagation path estimation transmitted from the antennas and generating frequency information to be interpolated using frequency information of the selected subcarriers.

Like this, when the receiver receives multicarrier symbols modulated by known signals having values different for the antennas, the extrapolating section determines relations between subcarriers on the basis of a combination of known signals different for the antennas for each of the subcarriers and selects frequency information on the basis of the result of the determination. In other words, the extrapolating section selects part or all of a plurality of subcarriers constituting a signal band on the basis of the characteristics of known signals having values different for the antennas (a combination of known signals having the same subcarrier number which have modulated subcarriers of the antennas), and generates frequency information to be interpolated on the basis of frequency information of the selected subcarriers. For this reason, propagations paths can be estimated by a time de-spread propagation path estimating method using frequency responses in frequencies wider than a frequency band actually transmitted, and thereby a distortion occurring at an end of the band can be reduced.

(3) In addition, in the receiver according to the present invention, the interpolation information generating section selects subcarriers for which a matrix generated by known signals different for the antennas is regular.

Like this, when subcarriers for which a matrix generated by known signals is regular are selected, the interpolation information generating section is able to calculate frequency responses from the antennas if the frequency characteristics in positions of the selected subcarriers do not almost change. By using the calculated values and extrapolating outside a band, propagations paths can be estimated by a time de-spread propagation path estimating method using frequency responses in frequencies wider than a frequency band actually transmitted, and thereby a distortion occurring at an end of the band can be reduced.

(4) A receiver according to the present invention receives symbols for propagation path estimation which include subcarriers modulated by different known signals generated by giving amounts of phase rotation $\theta$ different for two or more antennas between elements of a predetermined code and have been transmitted from the transmitting antennas and estimates propagation paths from the transmitting antennas, the receiver comprising: a Fourier transform section Fourier-transforming the received symbols for propagation path estimation to calculate first frequency information for each of the subcarriers; a signal generating section generating known signals which have been used for modulation of subcarriers included in the symbols for propagation path estimation; a dividing section dividing the first frequency information by one of the known signals to calculate second frequency information; an extrapolating section calculating and interpolating, from the second frequency information, information of frequency responses synthesized in positions where no subcarrier has been transmitted on the basis of the amount of phase rotation $\theta$ to calculate third frequency information; and an inverse Fourier transform section inverse-Fourier-transforming the third frequency information.

Like this, when the different known signals are made by making the amount of phase rotation $\theta$ given to each of the subcarriers values different for the transmitting antennas using one known signal, the extrapolating section is able to select subcarriers to select partial information on the basis of relations of phase differences given to subcarriers of the same subcarrier number caused by different amounts of phase rotation which have been set for the transmitting antennas, and generate and extrapolate suitable frequency information using second frequency information of the selected subcarriers. For this reason, propagations paths can be estimated by a time de-spread propagation path estimating method using frequency responses in frequencies wider than a frequency band actually transmitted, and thereby a distortion occurring at an end of the band can be reduced.

(5) In the receiver according to the present invention, the extrapolating section has an interpolation information generating section calculating a difference $\theta_{diff}$ between two different $\theta$ for all $\theta$, selecting subcarriers on the basis of $\theta_{diff}$, and generating frequency information to be interpolated using frequency information of the selected subcarriers.

Like this, subcarriers are selected on the basis of the calculated difference $\theta_{diff}$ between two different $\theta$ for all $\theta$, and frequency information to be interpolated is generated using frequency information of the selected subcarriers, so that suitable frequency information can be generated and extrapolated. For this reason, propagations paths can be estimated by a time de-spread propagation path estimating method using frequency responses in frequencies wider than a frequency band actually transmitted, and thereby a distortion occurring at an end of the band can be reduced.

(6) In the receiver according to the present invention, the interpolation information generating section calculates the smallest m satisfying $m \times |\theta_{diff}| = 2n\pi$ (m and n are natural numbers and $|\theta|$ is the absolute value of $\theta$) for each of the differences in amount of phase rotation $\theta_{diff}$ and selects, when the least common multiple of calculated m is LCM_A (LCM_A is an integer), frequency information from subcarriers arranged some multiples of the least common multiple LCM_A away from a subcarrier to be interpolated.

Like this, the interpolation information generating section performs extrapolation, so that propagations paths can be estimated by a time de-spread propagation path estimating method using frequency responses in frequencies wider than a frequency band actually transmitted, and thereby a distortion occurring at an end of the band can be reduced.

(7) In the receiver according to the present invention, the extrapolating section calculates, when all of the amounts of phase rotation $\theta$ are integer multiples of $\theta_g$, the smallest m satisfying $m \times |\theta_g| = 2n\pi$ (m and n are natural numbers and $|\theta|$ is the absolute value of $\theta$) as LCM_B (LCM_B is an integer), and selects frequency information from subcarriers arranged some multiples of the least common multiple LCM_B away from a subcarrier to be interpolated.

Like this, subcarriers for calculating interpolation frequency information can be selected on the basis of relations between the known signals. For this reason, suitable frequency information can be selected on the basis of relations between the known signals, so that propagations paths can be estimated by a time de-spread propagation path estimating method using frequency responses in frequencies wider than a frequency band actually transmitted, and thereby a distortion occurring at an end of the band can be reduced.

(8) In the receiver according to the present invention, the interpolation information generating section selects frequency information of subcarriers near a subcarrier to be interpolated.

Like this, by selecting frequency information of subcarriers near a subcarrier to be interpolated in addition to the relations between the known signals, interpolation frequency information can be calculated on the basis of frequency information of subcarriers near a propagation path characteristic. For this reason, a distortion can be more reduced.

(9) A frequency information estimating method according to the present invention is used for receiving symbols for propagation path estimation which include subcarriers modulated by different known signals and have been transmitted from two or more transmitting antennas and estimating propagation paths from the transmitting antennas, the method comprising the steps of: Fourier-transforming the received symbols for propagation path estimation to calculate first frequency information for each of the subcarriers; dividing the first frequency information by one of known signals which have been used for modulation of subcarriers included in the symbols for propagation path estimation to calculate second frequency information; calculating and interpolating, from the first frequency information or the second frequency information, information of frequency responses from the transmitting antennas in positions where no subcarrier has been transmitted to calculate third frequency information; and inverse-Fourier-transforming the third frequency information.

Like this, the receiver of the present invention calculates and interpolates, when receiving symbols for propagation path estimation transmitted from two or more transmitting antennas and estimating propagation paths, information of frequency responses from the transmitting antennas in positions where no subcarrier has been transmitted on the basis of the characteristics of the known signals. The symbols for propagation path estimation are received as symbols included in multicarrier symbols by the receiver. Furthermore, the symbols for propagation path estimation include subcarriers modulated by known signals different for the transmitting antennas at the transmitter side. Known signals which have been used for modulation at the transmitter side have been previously known in the receiver. Thus, the receiver is able to select subcarriers suitable for interpolation from subcarriers in a signal band and calculate interpolation frequency information using the first or second frequency information of the selected subcarriers. For this reason, propagations paths can be estimated by a time de-spread propagation path estimating method using frequency responses in frequencies wider than a frequency band actually transmitted, and thereby a distortion occurring at an end of the band can be reduced.

(10) A frequency information estimating method according to the present invention is used for receiving symbols for propagation path estimation which include subcarriers modulated by different known signals generated by giving amounts of phase rotation $\theta$ different for two or more transmitting antenna between elements of a predetermined code and have been transmitted from the transmitting antennas and estimating propagation paths from the transmitting antennas, the method comprising the steps of: Fourier-transforming the received symbols for propagation path estimation to calculate first frequency information for each of the subcarriers; dividing the first frequency information by one of known signals which have been used for modulation of subcarriers included in the symbols for propagation path estimation to calculate second frequency information; calculating and interpolating, from the second frequency information, information of frequency responses synthesized in positions where no subcarrier has been transmitted on the basis of the amount of phase rotation $\theta$ to calculate third frequency information; and inverse-Fourier-transforming the third frequency information.

Like this, when the different known signals are made by making amounts of phase rotation $\theta$ given to the subcarriers values different for the transmitting antennas using one known signal, the extrapolating section is able to select subcarriers to select partial information on the basis of relations of phase differences given to subcarriers of the same subcarrier number caused by different amounts of phase rotation θ which have been set for the transmitting antennas, and generate and extrapolate suitable frequency information using second frequency information of the selected subcarriers. For this reason, propagations paths can be estimated by a time de-spread propagation path estimating method using frequency responses in frequencies wider than a frequency band actually transmitted, and thereby a distortion occurring at an end of the band can be reduced.

Effect of the Invention

According to the present invention, when symbols for propagation path estimation transmitted from different antennas are received and a propagation path is estimated by a time de-spread propagation path estimating method, a distortion of the result of calculation of a frequency response caused by removing noise, etc. can be reduced by estimating frequency information interpolated based on the characteristics of different known signals at two or more antennas.

BRIEF DESCRIPTION OF THE DRAWINGS

FIG. 7A to 7D show the frequency responses of subcarrier numbers 381 to 384 in FIG. 5 with an (I, Q) plane.

DESCRIPTION OF NOTATIONS

Figure 1:
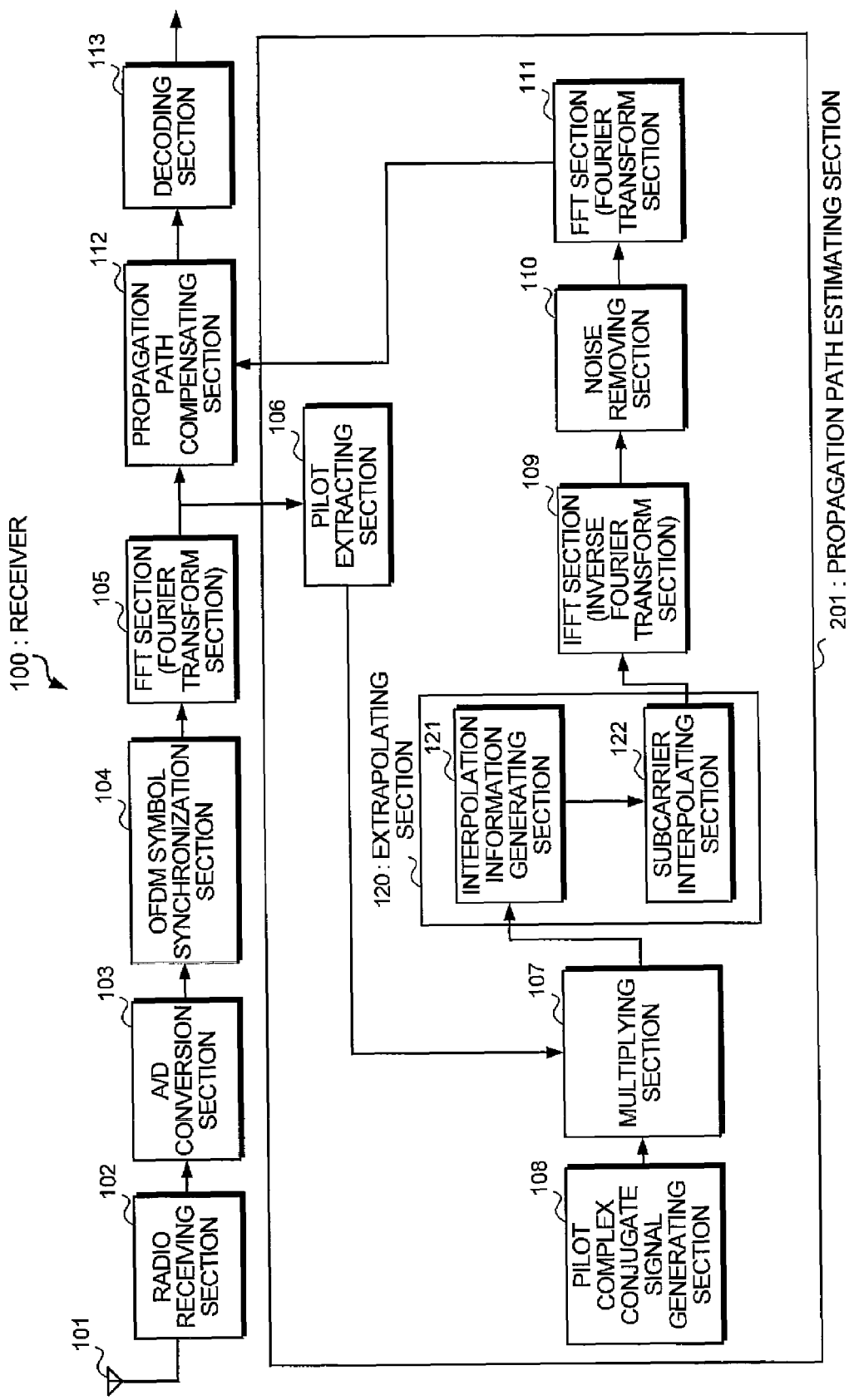
FIG. 1 is a block diagram showing an example of the configuration of a multicarrier radio receiver according to the present invention.

100: Receiver
101: Antenna section
102: Radio receiving section
103: A/D conversion section
104: OFDM symbol synchronization section
105, 111: FFT section
106: Pilot extracting section
107: Multiplying section
108: Pilot complex conjugate signal generating section
109: IFFT section
110: Noise removing section
112: Propagation path compensating section
113: Decoding section
120: Extrapolating section
121: Interpolation information generating section
122: Subcarrier interpolating section
201: Propagation path estimating section

BEST MODES FOR CARRYING OUT THE INVENTION

Next, embodiments of the present invention will be described with reference to the drawings. The same notation is added to components and equivalent portions having the same configuration or function in the drawings, and the description thereof will be omitted. Each of the embodiments will be described using a MIMO-OFDM system. However, the present invention is not limited to a MIMO-OFDM system and can be applied to a receiver and a frequency information estimating method which receive OFDM symbols for propagation path estimation (also referred to as pilot symbols; subcarriers to which known data is allocated in the pilot symbols are referred to as pilot subcarriers) which have been transmitted from two or more antennas and modulated by known signals (known codes) different for the antennas. Furthermore, to simplify the description, it is assumed that the number of transmitting antennas at the transmitter side is two and the OFDM symbols for propagation path estimation are simultaneously transmitted from the two transmitting antennas (transmitting antenna 1 and transmitting antenna 2). It is assumed that the different two antennas are installed on the same transmitter. However, this is not necessarily required and the present invention can also be applied to a system in which ODDM symbols for propagation path estimation are transmitted with about the same timing from antennas installed on different transmitters. Furthermore, each of the embodiments will be described assuming that the total number m of subcarriers to be used is 768 and the number of FFT points is 1024.

Furthermore, in the following description, it is assumed that all of the subcarriers in an OFDM symbol for propagation path estimation have been modulated by a signal known between a transmitter and a receiver. The known signal here consists of two or more elements (a complex signal, the amplitude of which is set to one for the sake of simplicity in many cases) and subcarriers in an OFDM symbol for propagation path estimation are modulated by each of the elements. It is assumed that an OFDM signal generated with a known signal C ($c_k$ is a component of C, and k is a positive integer not more than the number of subcarriers, indicating a subcarrier number) has been transmitted as an OFDM symbol for propagation path estimation from transmitting antenna 1. It is assumed that an OFDM signal generated with a known signal D ($d_k$ is a component of D, and k is a positive integer not more than the number of subcarriers, indicating a subcarrier number) has been transmitted as an OFDM symbol for propagation path estimation from transmitting antenna 2. Known signal C and known signal D may be written as code C and code D, respectively. $c_k$ and $d_k$ may be written as element $c_k$ and element $d_k$, or, component $c_k$ and component $d_k$, respectively.

Codes different for the antennas are used as known signals. For example, it is assumed that known signal C and known signal D described above are different from each other. Furthermore, in a CI method described in the second embodiment, two or more codes are generated by adding phase difference rotations different between subcarriers for the antennas to one known signal C, and such codes are also referred to as different codes.

In this specification, a Fourier transform is a concept including a fast Fourier transform (FFT) and a direct Fourier transform (DFT), and an inverse Fourier transform is a concept including an inverse fast Fourier transform (IFFT) and an inverse direct Fourier transform (IDFT). In the following description, a fast Fourier transform is used as a Fourier transform and an inverse fast Fourier transform is used as an inverse Fourier transform. However, the present invention can also be applied with a direct Fourier transform and an inverse direct Fourier transform. In the following description, a fast Fourier transform and an inverse fast Fourier transform are used, and the number of points of the Fourier transform (the number of Fourier points) is referred to as the number of FFT points, and the number of points of the inverse Fourier transform (the number of inverse Fourier points) is referred to as the number of IFFT points. Furthermore, a number indicated by a FFT point or an IFFT point is the same as a subcarrier number.

Furthermore, a band for which fast Fourier transform (inverse fast Fourier transform) processing is performed is referred to as a FFT processing band (IFFT processing band), and a band to which a signal is allocated of the FFT processing band is referred to as a signal band. A band obtained by removing the signal band from the FFT processing band is a band becoming a candidate of interpolation (extrapolation) and is referred to as an interpolation object band.

In addition, in the present invention, "a time de-spread propagation path estimating method" is used as a method of estimating a propagation path. This propagation path estimating method uses a Fourier transform and an inverse Fourier transform in estimation and compensation of a propagation path change and takes advantage of the fact that a delayed profile signal is concentrated in some range of the output of the inverse Fourier transform to remove noise and interference, and "a time de-spread gain" is a gain obtained by the time de-spread propagation path estimating method. However, when noise and interference are removed, an estimation error arises at an end of a signal band, which becomes a problem particularly when the quality of the propagation path is good. The present invention has a purpose of decreasing the influence of this distortion as much as possible. Specifically, the present invention solves the problem by extrapolating a frequency response of a position where a signal is not actually transmitted on the basis of codes used when generating OFDM signals for propagation path estimation.

In the following description, the first embodiment uses OFDM symbols for propagation path estimation in signals having no relation between codes used for transmission, while the second embodiment uses OFDM symbols for propagation path estimation in a method called a CI method.

First Embodiment

In the first embodiment, OFDM symbols for propagation path estimation modulated by known signals having values different for antennas are transmitted and received. In the first embodiment, the value of a known signal C is different from that of a known signal D. In this embodiment, the known signal C is represented by components ck (c1×$e^{j\theta 1}$, c2×$e^{j\theta 1}$, c3×$e^{j\theta 1}$, cm×$e^{j\theta 1}$), and the known signal D is represented by components dk (d1×$e^{j\theta 2}$, d2×$e^{j\theta 2}$, d3×$e^{j\theta 2}$, . . . , dm×$e^{j\theta 2}$), where ck and dk are ±1, m is the total number of subcarriers, and j is an imaginary unit. Thus, the OFDM symbols for propagation path estimation are the same as those obtained by BPSK-modulating each of the subcarriers.

FIG. 1 is a block diagram showing an example of the configuration of a receiver 100 according to the present invention. The receiver (multicarrier radio receiver) 100 shown in FIG. 1 has an antenna section 101, a radio receiving section 102, an analog-digital (A/D) conversion section 103, an OFDM symbol synchronization section 104, an FFT section (Fourier Transform section) 105, a propagation path compensating section 112, a decoding section 113, and a propagation path estimating section 201. The propagation path estimating section 201 has a pilot extracting section 106, a multiplying section 107, a pilot complex conjugate signal generating section 108, an IFFT section (Inverse Fourier Transform section) 109, a noise removing section 110, an FFT section 111, and an extrapolating section 120.

A signal received by the antenna section 101 is frequency-converted first to a frequency band in which A/D conversion from an analog signal to a digital signal is possible by the radio receiving section 102. The A/D conversion section 103 converts a frequency-converted signal to a digital signal. The OFDM symbol synchronization section 104 performs OFDM symbol synchronization about the digital signal to remove a guard interval (GI).

After that, the FFT section 105 performs a Fourier transform about the digital signal from which the GI has been removed to separate it into signals for each of the subcarriers.

Next, the signals for each of the subcarriers are input to the propagation path compensating section 112 and the propagation path estimating section 201, and the propagation path estimating section 201 performs the following processing.

The pilot extracting section 106 extracts pilot subcarrier signals from a Fourier-transformed OFDM symbol for propagation path estimation. In this embodiment, all of the subcarriers of an OFDM symbol for propagation path estimation are assumed to be pilot subcarrier signals, so that frequency information of all of the subcarriers is extracted. Extracted frequency information is multiplied, in the multiplying section 107, by complex conjugate signals of the pilot subcarrier signals generated by the pilot complex conjugate signal generating section 108 used in a transmitter. A propagation path change in a frequency domain can be obtained as an amplitude value and phase value of a propagation factor by multiplication of the multiplying section 107. The amplitude value and the phase value are referred as frequency information or a frequency response.

In this connection, it is originally necessary to perform complex division with codes used for the pilot subcarrier signals in order to obtain frequency information. However, in this embodiment and embodiments described below, a frequency response is obtained by assuming the amplitudes of the codes used for the pilot subcarrier signals to be 1 and using multiplication of the complex conjugate signals in place of complex division for a reduction in operated amount. The frequency response calculated by the complex division is a frequency response of a propagation path including noise and interference.

Furthermore, in this specification, an input to the multiplying section 107, that is, a signal extracted from a signal after Fourier-transforming by the pilot extracting section 106 is referred to as first frequency information. In addition, an output from the multiplying section 107, that is, a value obtained by multiplying the first frequency information by the complex conjugate signals is referred to as second frequency information.

With respect to the calculated second frequency information, the extrapolating section 120 extrapolates signals of subcarriers in an interpolation candidate band to which no signal is allocated and interpolates a frequency response. An output from the extrapolating section 120, that is, information to which extrapolation processing has been performed with respect to the second frequency information is referred to as third frequency information. The detailed operation of the extrapolating section 120 will be described later.

Next, the IFFT section 109 performs an inverse Fourier transform about the third frequency information to convert a propagation path change in a frequency domain to a propagation path change (impulse response or delayed profile) in a time domain. Usually, in a signal of a propagation path change in a time domain, power is concentrated in some range of an IFFT output, so that the noise removing section 110 assumes signals outside the range where power is concentrated to be noise and converts the signals to zero.

The FFT section 111 performs a Fourier transform to the output of the noise removing section 110, thereby calculating frequency information of an OFDM signal band. This is more accurate frequency information than the second frequency information and third frequency information obtained previously because noise and interference have been removed by the noise removing section 110. Frequency information output from the FFT section 111 is referred to as frequency information for compensation. Then, the propagation path compensating section 112 performs propagation path compensation using signals separated every subcarrier output from the FFT section 105 and frequency information for compensation output from the FFT section 111. For data to which propagation path compensation has been performed in this way, decoding processing such as demodulation and error correction is performed by the decoding section 113, and data is obtained. This data is sent to an upper layer or the like.

Next, the processing of the extrapolating section 120 will be described. The extrapolating section 120 is disposed between the multiplying section 107 and the IFFT section 109 in FIG. 1, but may be disposed between the pilot extracting section 106 and the multiplying section 107 as long as it is used in the first embodiment. Furthermore, an MIMO system using two transmitting antennas is assumed, so that the propagation path estimating section 201 estimates propagation path information of each of the two antennas. Although not described clearly in FIG. 1, propagation paths from two or more antennas are estimated by preparing two (the number of antennas) sets of the propagation path estimating section 201 or executing a loop as many times as the number of the antennas. In addition, although the propagation path compensating section 112 and the decoding section 113 need to perform operations according to MIMO receiving, the description about it is omitted because it does not influence the present invention.

As shown in FIG. 1, the extrapolating section 120 has an interpolation information generating section 121 and a subcarrier interpolating section 122. The interpolation information generating section 121 selects partial information, on the basis of a combination of different known signals used when an OFDM symbol for propagation path estimation is generated for each of the antennas, from any one of the first frequency information and the second frequency information, and generates interpolation frequency information, using selected information, which interpolates information of a signal band to which no signal has been allocated. In particular, in this embodiment, subcarriers causing interpolation frequency information are selected from a combination of known signals which have modulated subcarriers at the same position (of the same subcarrier number), and the interpolation frequency information is generated using the first frequency information or second frequency information of the selected subcarriers. The subcarrier interpolating section 122 interpolates the interpolation frequency information generated by the interpolation information generating section 121 to second frequency information to generate third frequency information. Specifically, the subcarrier interpolating section 122 adds the interpolation frequency information to the second frequency information.

Figure 2:
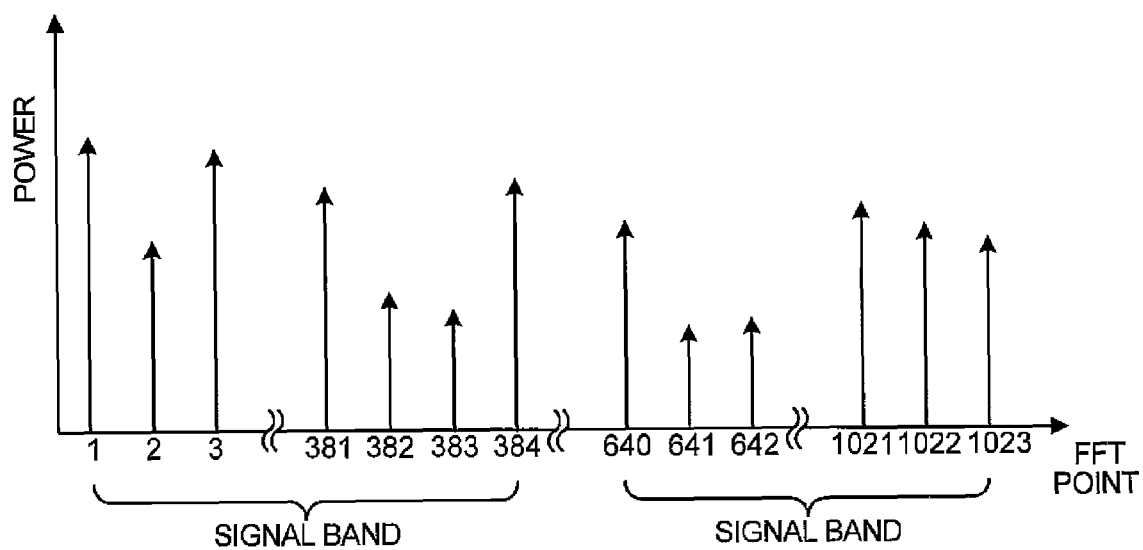
FIG. 2 shows an example of an input waveform to the extrapolating section of the first embodiment.

Next, the operation of the extrapolating section 120 of this embodiment will be shown in detail. An example of an input waveform (second frequency information) to the extrapolating section 120 (interpolation information generating section 121) is shown in FIG. 2. In FIG. 2, the horizontal axis indicates the FFT point, and the vertical axis indicates the power. OFDM signals for propagation path estimation transmitted from two transmitting antennas are input to the propagation path estimating section 201. In FIG. 2, FFT points of 385 to 639 are not used for filtering and zero corresponds to a DC (direct current) potential, and therefore an example of an input waveform which is not used in an ordinary OFDM system is shown. Thus, FIG. 2 shows a system using subcarriers in positions corresponding to 384 waves having FFT points of 1 to 384 and 384 waves having FFT points of 640 to 1023 (FIG. 2 shows a system in which two signal bands of 384 waves having FFT points of 1 to 384 and 384 waves having FFT points of 640 to 1023 are set. However, in a frequency band where actual transmission is performed, subcarriers are distributed to frequencies around a subcarrier set to a DC potential at the center of them.)

The interpolation information generating section 121 of the extrapolating section 120 estimates frequency responses of at least part of subcarriers of an interpolation object band in a guard band position where FFT points are unused FFT points of 385 to 639 to generate interpolation frequency information, and the subcarrier interpolating section 122 has a function of inserting estimated subcarrier frequency responses (interpolation frequency information) into subcarriers to be interpolated. In this embodiment, the interpolation information generating section 121 estimates frequency responses corresponding to the positions 385, 386, 638, 639, etc. of FFT points (subcarriers) of the interpolation object band from subcarriers on which signals actually exist (subcarriers of a signal band), and it will be described, as an example, to extrapolate a frequency response with respect to a subcarrier whose extrapolated (interpolated) subcarrier number is 385.

When a frequency response from antenna 1 is calculated, it is desirable to extrapolate the frequency response from antenna 1 in a subcarrier position to be extrapolated. Likewise, when a frequency response from antenna 2 is calculated, it is desirable to extrapolate the frequency response from antenna 2 in a subcarrier position to be extrapolated. In the following example, it is shown to calculate a frequency response from antenna 1.

First, the processing of estimating propagation path information from transmitting antenna 1 will be described. The pilot complex conjugate signal generating section 108 generates a complex conjugate signal $C^*=(c1 \times e^{-j\theta 1}, c2 \times e^{-j\theta 1}, \ldots, c768 \times e^{-j\theta 1})$ of a known signal C. The multiplying section 107 multiplies first frequency information for each of the subcarriers by the complex conjugate signal $C^*$ to calculate second frequency information.

Assuming that an actual frequency response of a subcarrier k from transmitting antenna 1 is $f_{1-k}$ and an actual frequency response from transmitting antenna 2 is $f_{2-k}$, data which is input to the extrapolating section 120 is $f_{1-k}+f_{2-k} \times e^{j(\theta 2-\theta 1)}$ or $f_{1-k}-f_{2-k} \times e^{j(\theta 2-\theta 1)}$ based on the frequency response from antenna 1 because $ck=\pm 1$ and $dk=\pm 1$ are premised. It depends on ck and dk whether a calculation on $f_{2-k}$ is plus or minus, and the calculation is plus when $ck \times dk=1$ and minus when $ck \times dk=-1$. Since it is particularly not necessary to limit $\theta 1$ and $\theta 2$, a frequency response input to the extrapolating section 120 is $f_{1-k}+f_{2-k}$, or, $f_{1-k}-f_{2-k}$ provided that $\theta 1=\theta 2$ is set when transmitting.

In FIG. 2, with respect to subcarriers of a signal band from 381 to 384 FFT points, it is shown that the 381st and 384th subcarriers are $f_{1-k}+f_{2-k}$ and the 382nd and 383rd subcarriers are $f_{1-k}-f_{2-k}$ according to the relation between ck and dk. Calculated second frequency information of each of the subcarriers is input from the multiplying section 107 to the interpolation information generating section 121. The interpolation information generating section 121 determines which subcarrier (FFT point)'s second frequency information of the signal band is used to generate interpolation frequency information interpolating the 385th subcarrier.

First, an environment where there is very little frequency variation of a propagation path in the whole of a signal band (environment where the frequency response of a propagation path is approximately constant) is assumed. In this case, it is considered that there is a little frequency response variation between subcarriers, so that it is considered that it is desirable to estimate a frequency response of a subcarrier to be interpolated using frequency responses of a small number of subcarriers in a signal band and close to an interpolation band as far as possible. It is described here to use frequency responses of the 383rd and 384th subcarriers. When $f_{1\text{-}383}$–$f_{2\text{-}383}$ which is the second frequency information of the 383rd subcarrier is referred to as F383 and $f_{1\text{-}384}$+$f_{2\text{-}384}$ which is the second frequency information of the 384th subcarrier is referred to as F384, the interpolation information generating section 121 calculates the value $f_{1\text{-}385}$ extrapolated 385th as (F383+F384)/2 to generate interpolation frequency information. It is assumed here that frequency variations at from 383 to 385 subcarrier positions are constant, so that it is possible to assume frequency responses from antenna 1 and frequency responses from antenna 2 at these subcarrier positions to be about the same. Then, only a frequency response from antenna 1 can be extracted by calculating (F383+F384). The subcarrier interpolating section 122 interpolates a value calculated by the calculation. When a frequency response from antenna 2 is estimated, (F383−F384)/2 is calculated and similar processing is performed.

In the above method, only a case of ck×dk=±1 is described. However, in the next example, a general case not having such a limitation will be described. The interpolation information generating section 121 is able to use simultaneous equations as a method of estimating the characteristics of propagations from the two antennas. For example, when the characteristic of propagation from transmitting antenna 1 is H1, the characteristic of propagation from transmitting antenna 2 is H2, a received signal of subcarrier 1 is S1, a received signal of subcarrier 2 is S2, a code used in subcarrier 1 when transmitted from transmitting antenna 1 is C11, a code used in subcarrier 2 when transmitted from transmitting antenna 1 is C12, and likewise codes used in subcarriers 1 and 2 when transmitted from transmitting antenna 2 are C21 and C22, the received signals (S1 S2) are given by

[Eq. 1]

$$\begin{pmatrix} S_1 \\ S_2 \end{pmatrix} = \begin{pmatrix} C_{11} & C_{21} \\ C_{12} & C_{22} \end{pmatrix} \begin{pmatrix} H_1 \\ H_2 \end{pmatrix} \quad (1)$$

, and the propagation characteristics H1 and H2 can be obtained by solving the simultaneous equations. For the simultaneous equations represented by expression (1) to have solutions, the matrix

[Eq. 2]

$$\begin{pmatrix} C_{11} & C_{21} \\ C_{12} & C_{22} \end{pmatrix} \quad (2)$$

must be regular. In short, it is necessary to select subcarrier 1 and subcarrier 2 by which expression (2) becomes regular.

In other words, frequency responses from antennas 1 and 2 of the 385th subcarrier can be calculated by substituting frequency responses of the 383rd and 384th subcarriers into expression (1). The subcarrier interpolating section 122 is able to increase the overall accuracy of propagation path estimation by performing equivalent interpolation of values calculated here as frequency responses of the subcarrier 385. Furthermore, in consideration of a frequency variation, a method can be considered which further calculates frequency responses from the 381st and 382nd subcarriers and calculates (first order approximation or the like) frequency responses of the 385th subcarrier from the frequency responses calculated from the 381st and 382nd subcarriers and values previously calculated from the 383rd and 384th subcarriers.

In the relation between this determinant and the number of transmitting antennas, it is a necessary condition that a minimum of M×M matrix is generated when the number of transmitting antennas is M and the matrix is regular. In this embodiment, the number of transmitting antenna is two, so that a 2×2 matrix is shown as an example.

Figure 3A:
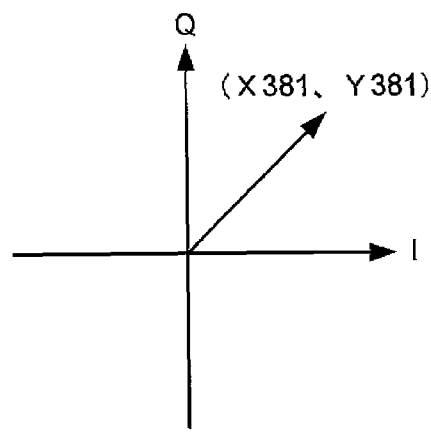
FIG. 3A to 3D show frequency responses of subcarrier numbers 381 to 384 in FIG. 2 with an (I, Q) plane.
Figure 3B:
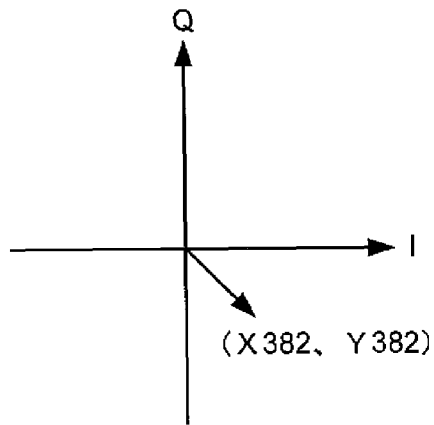
Figure 3C:
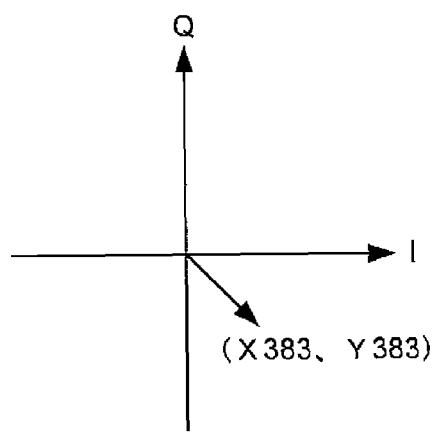
Figure 3D:
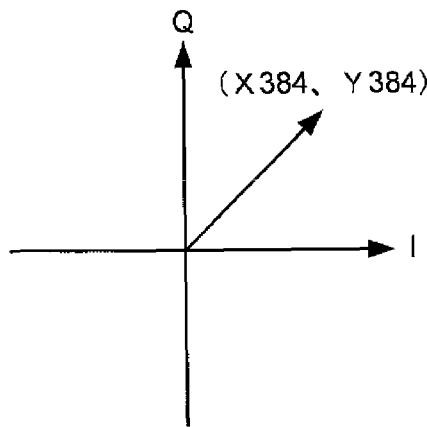

Although it has been described that the interpolation information generating section 121 generates interpolation frequency information (by equivalent interpolation) using the same value as a frequency response from each antenna calculated at an actual pilot subcarrier position in an environment where there is very little frequency variation of a propagation path, it is described here that the interpolation information generating section 121 estimates frequency information of a subcarrier to be interpolated from two or more subcarriers in a signal band considering that the frequency response varies. This method calculates, by first order approximation or the like, two or more patterns of synthetic frequency response (frequency responses from antenna 1 and antenna 2 are synthesized) in an extrapolation band from frequency responses of subcarriers for which a pilot has been actually transmitted, and then calculates, from the two or more patterns, frequency responses from each of the antennas in the subcarrier positions. Specifically, it is described that interpolation frequency information is generated using values represented by a (I, Q) plane of frequency responses of each of the subcarriers. FIG. 3 shows frequency responses of subcarrier numbers 381 to 384 in FIG. 2 with an (I, Q) plane. FIG. 3A shows a frequency response of subcarrier number 381, FIG. 3B shows a frequency response of subcarrier number 382, FIG. 3C shows a frequency response of subcarrier number 383, and FIG. 3D shows a frequency response of subcarrier number 384. In FIG. 3, each value in the I-Q plane is represented by (Xk, Yk) (k is a subcarrier number). For example, the interpolation information generating section 121 executes the following procedure in order to estimate the 385th frequency response (in order to generate interpolation frequency information of the 385th subcarrier);

(11) Estimating a frequency response $(X_{385\text{-}1}, Y_{385\text{-}1})$ of subcarrier 385 where c385×d385=1 from subcarriers where ck×dk=1,

(12) Estimating a frequency response $(X_{385\text{-}2}, Y_{385\text{-}2})$ of subcarrier 385 where c385×d385=−1 from subcarriers where ck×dk=−1, and

(13) calculating a frequency response $(X_{385}, Y_{385})$ of the 385th subcarrier from (11) and (12).

Assuming that the number of groups of subcarriers used for estimation of a synthetic frequency response in an interpolation position is two, subcarriers 381 and 384 are used in (11). When phase plane-like linear interpolation, for example, is used as an estimating method, the interpolation information generating section 121 obtains calculation results as described below. As a result of (11), $(X_{385-1}, Y_{385-1})$ is estimated by first order approximation using frequency response $(X_{381}, Y_{381})$ of subcarrier 381 and frequency response $(X_{384}, Y_{384})$ of subcarrier 384, thus being $((4 \times X_{384} - X_{381})/3, (4 \times Y_{384} - Y_{381})/3)$. Likewise, when calculated by (12), $(X_{385-2}, Y_{385-2})$ is $((3 \times X_{383} - X_{382}), (3 \times Y_{383} - Y_{382}))$. A value extrapolated as 385th frequency response for (13) is $((X_{385-1} + X_{385-2})/2, (Y_{385-1} + Y_{385-2})/2)$, that is, $((4 \times X_{384} + 9 \times X_{383} - 6 \times X_{382} - X_{381}), (4 \times Y_{384} + 9 \times Y_{383} - 6 \times Y_{382} - Y_{381}))$.

Like this, according to this embodiment, when receiving transmission symbols which have been obtained by modulating subcarriers by different known signals at two or more antennas and has been transmitted from them, frequency information of a subcarrier to be interpolated is selected on the basis of a combination of known signals which has modulated subcarriers of the same subcarrier number, and thereby frequency information to be interpolated can be calculated using frequency information of subcarriers selected according to the characteristics of received carriers from the antennas. For this reason, a distortion occurring in a time de-spread propagation path estimating method can be reduced.

In this embodiment, only a case of two antennas is described, but the number of antennas can be expanded to three or more by a similar method.

Furthermore, description is made about transmitting antenna 1 in the above, but a frequency response of a multi-carrier symbol transmitted from transmitting antenna 2 can be calculated by that the pilot complex conjugate signal generating section 108 generates a complex conjugate signal of a code dk and the extrapolating section 120 extrapolates it by a similar method.

In addition, in this embodiment, an example of two estimating methods of equivalent interpolation and first order linear interpolation is described. However, without limitation to the above description, various estimating methods can be considered and applied.

Second Embodiment

In the second embodiment, an OFDM symbol for propagation path estimation is generated using a CI method at a transmitting side. The configuration of the receiver 100 is the same as that in FIG. 1. The CI method generates a symbol for propagation path estimation with, for example, a code C and by giving a fixed phase rotation between subcarriers, and makes the amount of the phase rotation different between antennas, thereby enabling discrimination and propagation path estimation by a receiver. Here, it is assumed that the amount of phase rotation is also part of a code and OFDM signals for propagation path estimation are generated with codes different for transmitting antennas.

Thus, when the CI method is used, known signals for generating OFDM symbols for propagation path estimation used at the antennas are given in the case that there is a specific relation between a known signal C and a known signal D in the first embodiment. The specific relation is one in the case that a known signal D is a code which is generated from a known signal C and by giving, when the known signal C is allocated to a subcarrier, a fixed phase rotation between the subcarrier and a subsequent subcarrier. In this embodiment, it is assumed that an amount of phase rotation is n and there is the following relation between ck and dk.

[Eq. 3]

$$dk = ck \times e^{j \times \pi \times (k \bmod 2)} \quad (3)$$

where $j \times j = -1$. In other words, a known signal used at antenna 1 is generated by giving the phase rotation of zero to a code C between subcarriers, and a known signal used at antenna 2 is generated by giving the amount of phase rotation of n to a code C between subcarriers.

Here, a propagation path estimation technique using the CI method will be described. To simplify the following description, it is assumed that the number of transmitting antennas is two (transmitting antenna 1, transmitting antenna 2). In addition, it is assumed that all of the subcarriers are used as pilot subcarriers for propagation path estimation in an OFDM symbol for propagation path estimation and are known between a transmitter and a receiver.

At transmitting antenna 1, a component ck (k is a positive integer not more than the number of the subcarriers) of a known signal C known between the transmitter and the receiver is allocated to all of the subcarriers to generate an OFDM symbol for propagation path estimation, which is transmitted from transmitting antenna 1.

Likewise, at transmitting antenna 2, a component dk of a known signal D known between the transmitter and the receiver is allocated all of the subcarriers to generate an OFDM symbol for propagation path estimation, which is transmitted from transmitting antenna 2. There is a relation as shown in expression (3) described above between ck and dk, and dk is a code generated by converting a signal of ck according to a specific rule.

Next, a brief operation in the case that an OFDM symbol for propagation path estimation generated by the CI method is received and the propagation path estimating section 201 estimates a propagation path will be described.

Figure 4A:
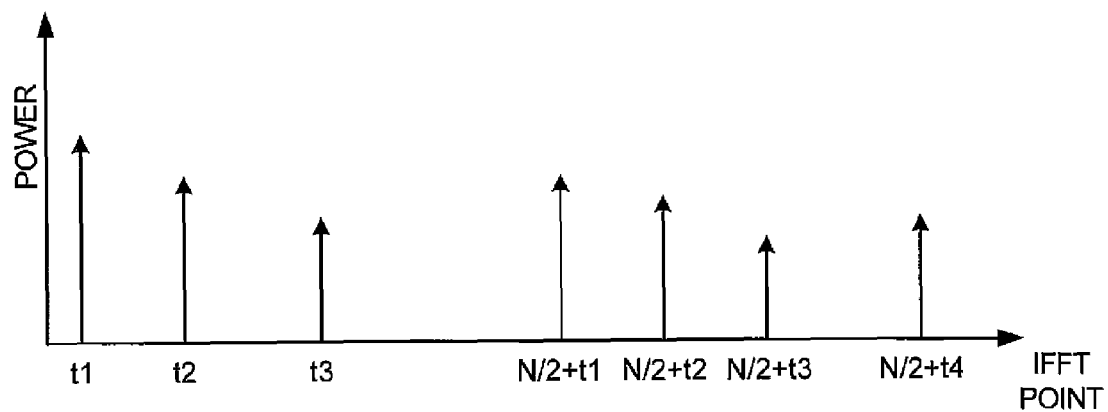
FIG. 4A and FIG. 4B show an example of the waveform of an output of the IFFT section of the receiver.
Figure 4B:
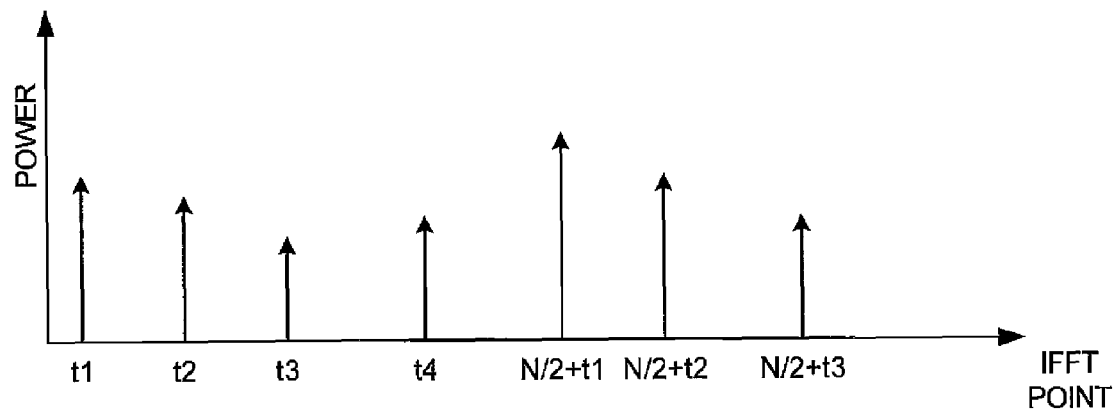

FIG. 4 shows an example of the waveform of an output of the IFFT section 109 of the receiver 100. FIG. 4 shows a waveform of the IFFT section 109 in the case that the total number of paths in a propagation path from transmitting antenna 1 to the receiving antenna is three (delays of them are t1, t2, and t3) and the total number of multicarriers in a propagation path from transmitting antenna 2 to the receiving antenna is four (delays of them are t1, t2, t3, and t4), where t1 to t4 are integral multiples of the time resolution of IFFT. In FIG. 4, the horizontal axis indicates the IFFT point (corresponding to the delayed profile time), and the vertical axis indicates the power. FIG. 4A shows a case that a signal generated by the pilot complex conjugate signal generating section 108 is a complex conjugate signal of ck, and FIG. 4B shows a case that this signal is a complex conjugate signal of dk and is different from FIG. 4A in pulse occurrence position.

When the total number of IFFT points is N, the difference between a path from transmitting antenna 1 and a path from transmitting antenna 2 is observed in a position away by N/2 points. This is because the amount of phase rotation between adjacent subcarriers of dk to that of ck is set to n (see expression (3)). Thus, when a propagation path from transmitting antenna 1 is calculated, the noise removing section 110 removes a pulse corresponding to signal power from transmitting antenna 2 and the FFT section 111 performs frequency conversion, and thereby a frequency response from transmitting antenna 1 can be calculated. Likewise, when a propagation path from transmitting antenna 2 is calculated, the noise removing section 110 removes a pulse corresponding to signal power from transmitting antenna 1 and the FFT section 111 performs frequency conversion, and thereby a frequency response from transmitting antenna 2 can be calculated.

By changing the amount of phase rotation shown here, similar processing is possible also for three or more transmitting antennas. For example, when four antennas are used, four kinds of impulse responses can be calculated by setting the amount of phase rotation between subcarriers for a component ck to 0, π/2, π, or 3π/2. However, it is necessary for a delay wave by each of the multipaths to be designed in the range where it does not overlap other impulses.

Figure 5:
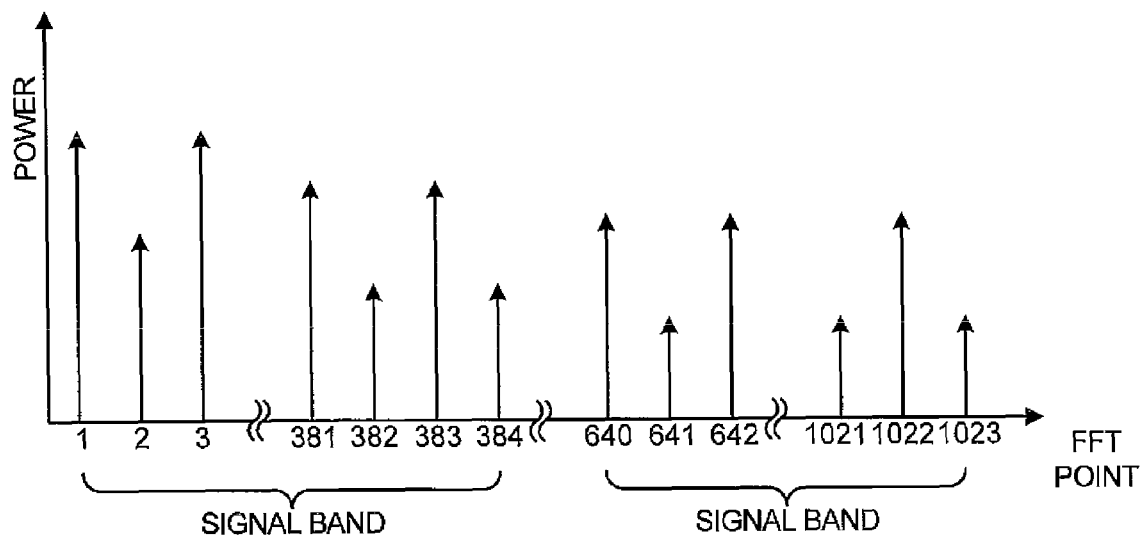
FIG. 5 shows an example of an input waveform to the extrapolating section of the second embodiment.

Next, details of the operation of the extrapolating section 120 of this embodiment will be described. In this embodiment, the interpolation information generating section 121 generates interpolation frequency information using second frequency information of a subcarrier selected based on a phase difference given to a known signal. FIG. 5 shows an example of a waveform (second frequency information) input to the extrapolating section 120 of this embodiment. FIG. 5 is different from FIG. 2 in that a subcarrier becoming $f_{1-k}+f_{2-k}$ and a subcarrier becoming $f_{1-k}-f_{2-k}$ are determined by a combination of codes (a combination of ck and dk) because there is no relation between the codes in the first embodiment and $f_{1-k}+f_{2-k}$ and $f_{1-k}-f_{2-k}$ are repeated every two subcarriers because there is a relation as shown in expression (3) between ck and dk in this embodiment.

Thus, when estimating a frequency response of a subcarrier in a guard band position to be extrapolated, the extrapolating section 120 estimates frequency response, when the number of the subcarrier is an even number, from even-numbered subcarriers actually received, and estimates the frequency response, when the number of the subcarrier is an odd number, from odd-numbered subcarriers actually received. An example of extrapolating two subcarriers (385th and 386th subcarriers) by the extrapolating section 120 is shown below.

When there is little frequency variation of a propagation path in some frequency band (there is little propagation path change in a subcarrier near a subcarrier to be interpolated), the interpolation information generating section 121 may interpolate the 383rd value to the 385th subcarrier and the 384th value to the 386th carrier with the same value. In the first embodiment, extrapolation processing is performed for each of the antennas, and a frequency response of transmitting antenna 1 is extrapolated when a frequency response from transmitting antenna 1 is calculated. However, in this embodiment, it is not necessary, and synthetic frequency responses from all of the antennas are extrapolated. The reason will be described simply.

A purpose of extrapolation is, when the number of subcarriers is different from the number of FFT points, to prevent a distortion of a frequency response caused by the expansion of signal power occurring when a time response is obtained in a time de-spread propagation path estimating method. When estimation similar to that of the second embodiment is performed in the first embodiment, there is a tradeoff relation between a reduction in distortion caused by extrapolation and an increase in distortion caused by an accuracy deterioration by an increase in an interference component. Thus, when a frequency response from transmitting antenna 1 is obtained in such a manner that there is no increase in interference, an estimated value of only a frequency response of transmitting antenna 1 is extrapolated.

On the other hand, in this embodiment, dk is a code generated from ck according to expression (3), so that a signal can be separated with the output of the IFFT section. In addition, when extrapolation as shown in this embodiment is performed, signal components from the antennas for which frequency responses are calculated and signal components from the antennas becoming interference also have little increase in interference component because the expansion in time response contributes to the reduction. Thus, in this embodiment, a means for extrapolation as described above is used.

Next, a case that the frequency variation of a propagation path is small in a frequency band will be shown. In this case, the frequency response of a subcarrier to be interpolated are estimated from two or more subcarriers in a signal band by a means such as linear interpolation, and thereby the accuracy can be increased. In this embodiment, a method of interpolating linearly from two subcarriers actually received is shown. Extrapolation to an odd-numbered subcarrier is performed by estimation from odd-numbered subcarriers received, and extrapolation to an even-numbered subcarrier is performed by estimation from even-numbered subcarriers received.

Figure 6:
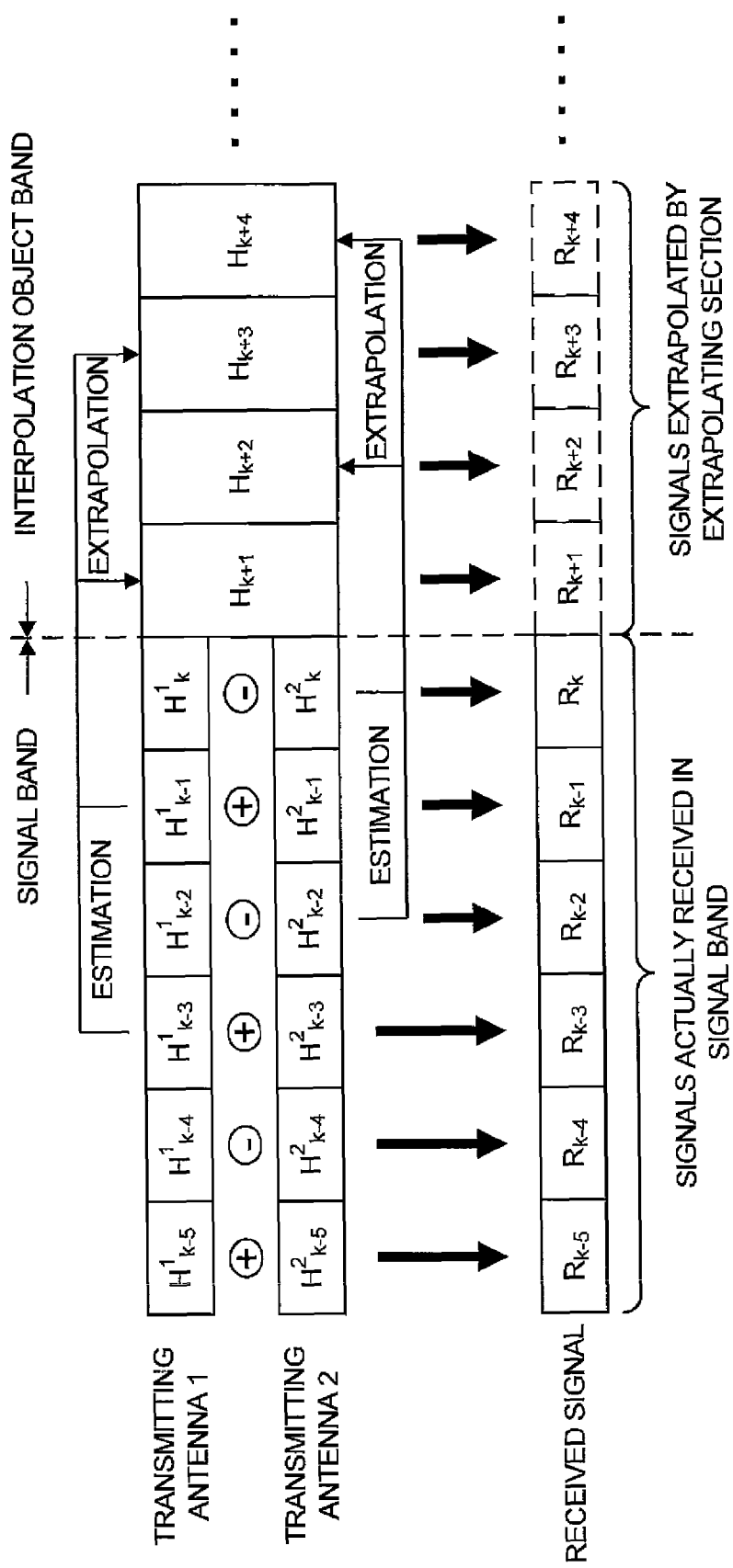
FIG. 6 depicts selection of subcarriers to be interpolated.

FIG. 6 depicts an example of selection of subcarriers to be interpolated. In FIG. 6, $H^P_Q$ represents a frequency response of the Qth subcarrier (FFT point) with respect to a known signal transmitted from antenna P. $R_Q$ represents a received signal of the Qth subcarrier, and in this Figure, it is a signal actually received in a signal band (subcarriers from k−5 to k) and is a signal to be extrapolated by the extrapolating section 120 outside the signal band (subcarriers k+1 and later). Subcarrier k is at an end of the signal band. When performing extrapolation, information calculated using the frequency responses of subcarriers k−1 and k−3 is interpolated to subcarrier k+1, information calculated using the frequency responses of subcarriers k and k−2 is interpolated to subcarrier k+2, and interpolation is performed similarly also for subcarriers k+3 and later. The relation between a position to be interpolated and subcarrier positions for generating information for interpolation will be described in detail but can be uniquely decided with the number of antennas and an amount of phase rotation used when generating an OFDM symbol for propagation path estimation by a CI method. As shown in FIG. 6, when the number of antennas is two and the amount of phase rotation is π, a signal from transmitting antenna 2 is inverted every two subcarriers. Thus, the interpolation information generating section 121 generates interpolation frequency information using frequency responses obtained every two subcarriers. Furthermore, a synthetic frequency response in a subcarrier position to be extrapolated is calculated as in the case of equivalent interpolation.

Here, as an example, first order linear interpolation is shown. Specifically, a method of extrapolation to the 385th subcarrier position and the 386th subcarrier position is shown. FIG. 7 shows the frequency responses of subcarrier numbers 381 to 384 in FIG. 5 with an (I, Q) plane. FIG. 7A shows the frequency response of subcarrier number 381, FIG. 7B shows the frequency response of subcarrier number 382, FIG. 7C shows the frequency response of subcarrier number 383, and FIG. 7D shows the frequency response of subcarrier number 384. In FIG. 7, each value in the I-Q plane is represented by (Xk, Yk). For example, the interpolation information generating section 121 executes the following procedure in order to estimate the 385th frequency response.

(21) Estimating the 385th frequency response from the 381st and 383rd subcarriers, and

(22) Estimating the 386th frequency response from the 382nd and 384th subcarriers.

Although there is no third step as compared with the first embodiment, an impulse is separated after IFFT even if propagation paths from the antennas in positions to be extrapolated are not estimated as previously shown, so that the propagation path estimation characteristic in the band can be improved by steps up to the 2nd step (only the synthesized frequency response must be calculated).

As a result of this, $(X_{385}, Y_{385})$ becomes $((2 \times X_{383} - X_{381}), (2 \times Y_{383} - Y_{381}))$ using $(X_{381}, Y_{381})$ and $(X_{383}, Y_{383})$ from the above (21). Likewise, $(X_{386}, Y_{386})$ becomes $((2 \times X_{384} - X_{382}), (2 \times Y_{384} - Y_{382}))$ from the above (22).

In this embodiment, equivalent interpolation and first order linear interpolation are described as estimating methods, but estimating methods are not limited to them and various estimating methods can be used. It is important to decide subcarriers used for estimation on the basis of a rotation phase by a CI method and the number of antennas when calculating a frequency response to be extrapolated.

Other estimating methods includes a method of following only a phase. When interpolating 385th and after odd-numbered subcarriers, this method equates the amplitudes to the 385th one, equates the difference between the 381st phase and the 383rd phase to the difference between the 383rd phase and the 385th phase, and subsequently performs similar processing.

Furthermore, a better characteristic can be obtained by increasing the number of subcarriers to be interpolated when the delay dispersion of a propagation path is small and by decreasing the number of subcarriers to be interpolated when the delay dispersion of a propagation path is large.

In addition, in the case that a phase rotation is given to a base code to generate another code and a known signal of an OFDM signal for propagation path estimation is generated as shown in the second embodiment, how to select subcarriers causing frequency information to be interpolated is generalized as follows. When the amount of phase rotation θ of each of the antennas can be represented by an integral multiple of $\theta_g$ subcarriers used for extrapolation can be decided as follows. First, the smallest m satisfying $m \times |\theta_g| = 2$ nπ (m and n are natural numbers and |θ| is the absolute value of θ) is referred to as LCM (LCM_A is a natural number). When a subcarrier number in a position to be extrapolated is k, a received subcarrier in a position at a distant of some multiples of LCM_A from k may be assumed to be a subcarrier used for extrapolation. In other words, the interpolation information generating section 121 selects frequency information from among subcarriers k±LCM_A, k±2LCM_A, . . . arranged some multiples of LCM_A away from subcarrier k to be interpolated and estimates the frequency information of subcarrier k.

In addition, in order to generalize the amount of phase rotation, differences in the amount of phase rotation $\theta_{diff}$ given between antennas are required. Thus, when the number of antennas to be used is M, it is necessary to use M×(M−1)/2 kinds of differences in the amount of phase rotation.

With respect to all of the differences in the amount of rotation $\theta_{diff}$, the smallest $m_a$ satisfying $m_a \times |\theta_{diff}| = 2n\pi$ (a and diff are all integers not more than M×(M−1)/2) is calculated. Assuming that the least common multiple of all $m_a$ is LCM_B, LCM_B means the number of repetitions of a wave. In other words, the interpolation information generating section 121 selects frequency information from among subcarriers k±LCB_B, k±2LCB_B, . . . , arranged some multiples of LCM_B away from subcarrier k to be interpolated and estimates the frequency response of subcarrier k. However, in consideration of a variation of a frequency response, it is better to use subcarriers near a subcarrier to be extrapolated as far as possible.

It becomes possible by performing extrapolation as described above to perform precision propagation path estimation using an OFDM symbol for propagation path estimation which has been transmitted by a CI method.

The number of subcarriers to be extrapolated is one as an example in the first embodiment and two as an example in the second embodiment. However, this number is not specifically significant and depends on propagation path environment where a system is used. Furthermore, all of the subcarriers of an OFDM symbol for propagation path estimation are used as pilot carriers. However, also in the case that pilot carriers are inserted at regular intervals, precision propagation path estimation similarly becomes possible because the intervals are considered only when extrapolation and interpolation are performed.

The invention claimed is:

1. A receiver receiving symbols for propagation path estimation which include subcarriers modulated by different known signals and have been transmitted from two or more transmitting antennas and estimating propagation paths from said transmitting antennas, the receiver comprising:
   a Fourier transform section Fourier-transforming the received symbols for propagation path estimation to calculate first frequency information for each of the subcarriers;
   a signal generating section generating known signals which have been used for modulation of subcarriers included in the symbols for propagation path estimation;
   a dividing section dividing said first frequency information by one of said known signals to calculate second frequency information;
   an extrapolating section calculating and extrapolating, from said first frequency information or said second frequency information, information of frequency responses from said transmitting antennas in positions outside the signal band to generate third frequency information; and
   an inverse Fourier transform section inverse-Fourier-transforming said third frequency information,
   wherein said extrapolating section has an interpolation information generating section selecting subcarriers on the basis of a combination of known signals which have modulated subcarriers in the same position of symbols for propagation path estimation transmitted from said antennas and generating frequency information to be interpolated using frequency information of the selected subcarriers.

2. The receiver according to claim 1, wherein said interpolation information generating section selects subcarriers for which a matrix generated by known signals different for said antennas is regular.

3. A receiver receiving symbols for propagation path estimation which include subcarriers modulated by different known signals generated by giving amounts of phase rotation θ different for two or more transmitting antennas between elements of a predetermined code and have been transmitted from said transmitting antennas and estimating propagation paths from said transmitting antennas, the receiver comprising:
   a Fourier transform section Fourier-transforming the received symbols for propagation path estimation to calculate first frequency information for each of the subcarriers;
   a signal generating section generating known signals which have been used for modulation of subcarriers included in the symbols for propagation path estimation;
   a dividing section dividing said first frequency information by one of said known signals to calculate second frequency information;
   an extrapolating section calculating and extrapolating, from said second frequency information, information of frequency responses synthesized in positions outside the signal band on the basis of said amount of phase rotation θ to generate third frequency information; and an inverse Fourier transform section inverse-Fourier-transforming said third frequency information, wherein said extrapolating section calculates, when all of said amounts of phase rotation θ are integer multiples of $\theta_g$, the smallest m satisfying m×|$\theta_g$|=2nπ (m and n are natural numbers and |θ| is the absolute value of θ) as LCM_A (LCM_A is an integer), and selects frequency information from subcarriers arranged some multiples of said least common multiple LCM_A away from a subcarrier to be interpolated.

4. The receiver according to claim 3, wherein said extrapolating section has an interpolation information generating section calculating a differences $\theta_{diff}$ between two different θ for all θ, selecting subcarriers on the basis of $\theta_{diff}$, and generating frequency information to be interpolated using frequency information of the selected subcarriers.

5. The receiver according to claim 4, wherein said interpolation information generating section calculates the smallest m satisfying m×|$\theta_{diff}$|=2nπ (m and n are natural numbers and θ is an absolute value) for each of said differences in amount of phase rotation $\theta_{diff}$ and selects, when the least common multiple of calculated m is LCM_B (LCM_B is an integer), frequency information from subcarriers arranged some multiples of said least common multiple LCM_B away from a subcarrier to be interpolated.

6. The receiver according to claim 3, wherein said interpolation information generating section selects frequency information of subcarriers near a subcarrier to be interpolated.

7. A frequency information estimating method used for receiving symbols for propagation path estimation which include subcarriers modulated by different known signals and have been transmitted from two or more transmitting antennas and estimating propagation paths from said transmitting antennas, the method comprising the steps of:

Fourier-transforming the received symbols for propagation path estimation to calculate first frequency information for each of the subcarriers;

dividing said first frequency information by one of known signals which have been used for modulation of subcarriers included in the symbols for propagation path estimation to calculate second frequency information;

calculating and extrapolating, from said first frequency information or said second frequency information, information of frequency responses from said transmitting antennas in positions outside the signal band to generate third frequency information; and inverse-Fourier-transforming said third frequency information, wherein said extrapolating step has an interpolation information generating step selecting subcarriers on the basis of a combination of known signals which have modulated subcarriers in the same position of symbols for propagation path estimation transmitted from said antennas and generating frequency information to be interpolated using frequency information of the selected subcarriers.

8. A frequency information estimating method used for receiving symbols for propagation path estimation which include subcarriers modulated by different known signals generated by giving amounts of phase rotation θ different for two or more transmitting antennas between elements of a predetermined code and have been transmitted from said transmitting antennas and estimating propagation paths from said transmitting antennas, the method comprising the steps of:

Fourier-transforming the received symbols for propagation path estimation to calculate first frequency information for each of the subcarriers;

dividing said first frequency information by one of known signals which have been used for modulation of subcarriers included in the symbols for propagation path estimation to calculate second frequency information;

calculating and extrapolating, from said second frequency information, information of frequency responses synthesized in positions outside the signal band on the basis of said amount of phase rotation θ to generate third frequency information; and inverse-Fourier-transforming said third frequency information, wherein said extrapolating step has an interpolation information generating step calculating a differences $\theta_{diff}$ between two different θ for all θ, selecting subcarriers on the basis of $\theta_{diff}$, and generating frequency information to be interpolated using frequency information of the selected subcarriers, wherein said interpolation information generating step calculates the smallest m satisfying m×|$\theta_{diff}$|=2nπ (m and n are natural numbers and θ is an absolute value) for each of said differences in amount of phase rotation $\theta_{diff}$ and selects, when the least common multiple of calculated m is LCM_B (LCM_B is an integer), frequency information from subcarriers arranged some multiples of said least common multiple LCM_B away from a subcarrier to be interpolated.

9. A receiver receiving symbols for propagation path estimation which include subcarriers modulated by different known signals and have been transmitted from two or more transmitting antennas and estimating propagation paths from said transmitting antennas, the receiver comprising:

a Fourier transform section Fourier-transforming the received symbols for propagation path estimation to calculate first frequency information for each of the subcarriers;

a signal generating section generating known signals which have been used for modulation of subcarriers included in the symbols for propagation path estimation;

a dividing section dividing said first frequency information by one of said known signals to calculate second frequency information;

an extrapolating section calculating and interpolating, from said first frequency information or said second frequency information, information of frequency responses from said transmitting antennas in positions where no subcarrier has been transmitted to generate third frequency information; and an inverse Fourier transform section inverse-Fourier-transforming said third frequency information, wherein said extrapolating section has an interpolation information generating section selecting subcarriers on the basis of a combination of known signals which have modulated subcarriers in the same position of symbols for propagation path estimation transmitted from said antennas and generating frequency information to be interpolated using frequency information of the selected subcarriers, and said interpolation information generating section selects subcarriers for which a matrix generated by known signals different for said antennas is regular.

10. A receiver receiving symbols for propagation path estimation which include subcarriers modulated by different known signals generated by giving amounts of phase rotation θ different for two or more transmitting antennas between elements of a predetermined code and have been transmitted from said transmitting antennas and estimating propagation paths from said transmitting antennas, the receiver comprising:

a Fourier transform section Fourier-transforming the received symbols for propagation path estimation to calculate first frequency information for each of the subcarriers;

a signal generating section generating known signals which have been used for modulation of subcarriers included in the symbols for propagation path estimation;

a dividing section dividing said first frequency information by one of said known signals to calculate second frequency information;

an extrapolating section calculating and interpolating, from said second frequency information, information of frequency responses synthesized in positions where no subcarrier has been transmitted on the basis of said amount of phase rotation θ to generate third frequency information; and an inverse Fourier transform section inverse-Fourier-transforming said third frequency information, wherein said extrapolating section has an interpolation information generating section calculating a differences $\theta_{diff}$ between two different θ for all θ, selecting subcarriers on the basis of $\theta_{diff}$ and generating frequency information to be interpolated using frequency information of the selected subcarriers.

11. A receiver receiving symbols for propagation path estimation which include subcarriers modulated by different known signals generated by giving amounts of phase rotation θ different for two or more transmitting antennas between elements of a predetermined code and have been transmitted from said transmitting antennas and estimating propagation paths from said transmitting antennas, the receiver comprising:

a Fourier transform section Fourier-transforming the received symbols for propagation path estimation to calculate first frequency information for each of the subcarriers;

a signal generating section generating known signals which have been used for modulation of subcarriers included in the symbols for propagation path estimation;

a dividing section dividing said first frequency information by one of said known signals to calculate second frequency information;

an extrapolating section calculating and extrapolating, from said second frequency information, information of frequency responses synthesized in positions outside the signal band on the basis of said amount of phase rotation θ to generate third frequency information; and an inverse Fourier transform section inverse-Fourier-transforming said third frequency information, wherein said extrapolating section has an interpolation information generating section calculating a differences $\theta_{diff}$ between two different θ for all θ, selecting subcarriers on the basis of $\theta_{diff}$ and generating frequency information to be interpolated using frequency information of the selected subcarriers, wherein said interpolation information generating section calculates the smallest m satisfying $m \times |\theta_{diff}| = 2n\pi$ (m and n are natural numbers and θ is an absolute value) for each of said differences in amount of phase rotation $\theta_{diff}$ and selects, when the least common multiple of calculated m is LCM_B (LCM_B is an integer), frequency information from subcarriers arranged some multiples of said least common multiple LCM_B away from a subcarrier to be interpolated.

12. A frequency information estimating method used for receiving symbols for propagation path estimation which include subcarriers modulated by different known signals generated by giving amounts of phase rotation θ different for two or more transmitting antennas between elements of a predetermined code and have been transmitted from said transmitting antennas and estimating propagation paths from said transmitting antennas, the method comprising the steps of:

Fourier-transforming the received symbols for propagation path estimation to calculate first frequency information for each of the subcarriers;

dividing said first frequency information by one of known signals which have been used for modulation of subcarriers included in the symbols for propagation path estimation to calculate second frequency information;

calculating and extrapolating, from said second frequency information, information of frequency responses synthesized in positions outside the signal band on the basis of said amount of phase rotation θ to generate third frequency information; and inverse-Fourier-transforming said third frequency information, wherein said extrapolating section calculates, when all of said amounts of phase rotation θ are integer multiples of $\theta_g$, the smallest m satisfying $m \times |\theta_g| = 2n\pi$ (m and n are natural numbers and |θ| is the absolute value of θ) as LCM_A (LCM_A is an integer), and selects frequency information from subcarriers arranged some multiples of said least common multiple LCM_A away from a subcarrier to be interpolated.

* * * * *